United States Patent [19]

Bielecki et al.

[11] Patent Number: 4,592,904

[45] Date of Patent: Jun. 3, 1986

[54] PROCESS FOR PRODUCING COLUMBIUM OXYFLUORIDE

[75] Inventors: Edwin J. Bielecki, Boyertown; C. Edward Mosheim, Hereford Township, Berks County, both of Pa.; Umedray L. Sheth, Mobile, Ala.

[73] Assignee: Cabot Corporation, Boston, Mass.

[21] Appl. No.: 351,348

[22] Filed: Feb. 22, 1982

[51] Int. Cl.[4] ............................................. C01G 33/00
[52] U.S. Cl. ........................................ 423/472; 75/84; 423/65; 423/66
[58] Field of Search ................ 75/84; 423/65, 66, 472

[56] References Cited

U.S. PATENT DOCUMENTS 3,072,459  1/1963  Foos ...................................... 423/66
3,975,495  8/1976  Bowerman ............................ 423/65

OTHER PUBLICATIONS

Ferris, *Chemical Abstracts,* vol. 65 (1966) No. 11,409a.

*Primary Examiner*—Jack Cooper
*Attorney, Agent, or Firm*—Robert J. Feltovic; Jack Schuman

[57] ABSTRACT

A process for the recovery of columbium values from a columbium-containing aqueous hydrofluoric acid solution. The columbium-containing solution is heated, with agitation, to cause evaporation and hydrolysis, resulting in the formation of a slurry from which columbium oxyfluoride can be separated and recovered.

21 Claims, No Drawings

PROCESS FOR PRODUCING COLUMBIUM OXYFLUORIDE

Columbium-containing ores effectively have been processed by digesting the ores with hydrofluoric acid to leach the soluble columbium and tantalum values. The task of separation and purification of the metals is carried out through liquid/liquid extraction techniques, using any suitable solvent, commonly methyl isobutyl ketone (MiBK). The hydrofluoric acid digest solution is contacted with the ketone, and, under conditions of high acidity, both columbium and tantalum are transferred to the organic phase while other elements remain in the raffinate. When the organic extract is contacted with a lower acidity, aqueous solution of hydrofluoric acid, the columbium is preferentially back-extracted into the aqueous phase, leaving the tantalum in the organic phase.

In order to recover the columbium values from the aqueous phase, the columbium fraction, which essentially is an MiBK saturated aqueous solution of an oxyfluorocolumbic acid ($H_2CbOF_5$) and hydrogen fluoride (HF), typically has been treated with ammonia to precipitate columbium hydroxide, $Cb(OH)_5$, which then can be converted to columbium oxide, $Cb_2O_5$, by high temperature calcination treatment. By-product ammoniumfluoride generated by this technique, however, creates a significant problem of environmental disposal or recovery. An improved technique, avoiding the use of ammonia, is disclosed in U.S. Pat. No. 4,164,417 (issued Aug. 14, 1979 to Robert A. Gustison). In this method, columbium values are recovered from aqueous hydrofluoric acid solutions by evaporating such solutions to dryness and then baking the residue to recover a columbium oxyfluoride product (generally represented by the formula $CbO_2F$).

Now according to the present invention, a further improved process has been discovered for the recovery of columbium values from a columbium-containing hydrofluoric acid solution. It has been discovered that a columbium-containing aqueous hydrofluoric acid solution can be heated, with agitation, in a reactor to cause evaporation and hydrolysis, resulting in a columbium oxyfluoride-containing slurry from which the $CbO_2F$ readily can be separated and recovered. Unexpectedly, such a process accomplishes the recovery of a free-flowing, non-hydrated, granular product.

The capability of recovering $CbO_2F$ from solution accommodates the utilization of a batch, as well as a semi-continuous, or a continuous process. For example, in a batch operation, a columbium-containing hydrofluoric acid solution is heated, with agitation, in a reactor to form a $CbO_2F$ slurry, which then can be separated and recovered from the liquid phase. In a semi-continuous process, the $CbO_2F$ can be recovered from a portion of the slurry, after which the liquid phase can be recycled back to the reactor and additional aqueous feed can be introduced to the reactor at a rate sufficient to maintain a suitable volume. By repeating this sequence, a semi-continuous operation is accomplished. Developing a continuous process scheme, a stream of $CbO_2F$-containing slurry can be continuously drawn off from the reactor, $CbO_2F$ can be separated from the liquid phase, and the liquid phase can be recycled back to the reactor along with additional aqueous feed steadily introduced at a rate sufficient to maintain a suitable volume in the reactor.

In a typical process scheme for practicing the subject invention, columbium-bearing ore first is digested and a purified columbium fraction is obtained using conventional production procedures. For example, the ore can be digested with hydrofluoric acid and the columbium values recovered by MiBK based liquid/liquid extraction. The resulting MiBK saturated aqueous solution of columbium and hydrogen fluoride has a composition which may vary in concentration. Generally, the solution may contain from about 25 to about 150 g/L of dissolved columbium, with a molar ratio of fluorine (F) to columbium (Cb) of at least about 4 in order to keep the columbium in solution. Typically, the solution contains from about 80 to about 110 g/L of dissolved columbium at a fluorine to columbium mole ratio of about 8:1 to about 10:1.

The columbium fraction preferably is pre-concentrated. This can be accomplished by heating the aqueous solution to boiling, i.e. at a temperature of at least about 100° C., generally about 120° C. The fraction is evaporated such that the resultant concentrated columbium fraction contains up to about 700 g/L of dissolved columbium; preferably the concentrated fraction contains from about 250 to about 600 g/L, most preferably about 500 g/L of dissolved columbium; at a fluorine to columbium molar ratio of at least 4.5, preferably about 5.5 to about 6.0. During this concentration step, the solvent (e.g., MiBK) as well as aqueous HF can be condensed from the vapor phase for recycle utility.

The columbium fraction, preferably pre-concentrated, then is heated to boiling in a reactor to thereby cause further evaporation and hydrolysis of the aqueous columbium solution. Under agitation conditions suitable to maintain hydrolyzed solids in suspension, a fine granular columbium oxyfluoride product crystallizes from solution. To accomplish this hydrolysis-crystallization, under atmospheric pressure conditions, the solution is maintained at a temperature of at least about 100° C.; preferably from about 100° C. to about 180° C. A particularly preferred hydrolysis temperature has been found to be about 150° C. to about 160° C. Reduced or increased pressures may be used to lower or raise the operating temperature, if desired. The agitation used may be of any type suitable to maintain the hydrolyzed solids in suspension in the slurry. Typical agitation means include stirrers, circulating pumps, and the like.

Once an economically practical amount of crystallized product has formed in the slurry, the columbium oxyfluoride readily can be separated from the liquid phase. Filtration has been found to be a convenient and effective separation technique, using, for example, a fluorocarbon filter medium.

Advantageously, the present invention can be practiced in a batch, semi-continuous, or continuous process scheme. It is most efficiently utilized in a semi-continuous or continuous operation. According to such a process, a portion of the columbium oxyfluoride-containing slurry is periodically or continuously removed from the hydrolyzer-crystallizer reactor. The crystallized columbium oxyfluoride then is separated from the liquid phase of the removed slurry portion, and the filtrate liquid phase is recycled back to the reactor. Additional columbium-containing aqueous feed solution is introduced into the reactor periodically or continuously at a rate sufficient to maintain a suitable slurry volume in the reactor and prevent evaporation of the slurry to dryness. According to this sequence of steps, a columbium oxyfluoride product can be semi-continuously or continuously produced and recovered.

The following examples are provided to further illustrate the invention. The examples are intended to be illustrative in nature and are not to be construed as limiting the scope of the invention.

EXAMPLE I

A fluorocarbon beaker containing a fluorocarbon-coated stirring bar and fitted with a polypropylene condenser was positioned on a hot plate equipped with magnetic stirring capability. To the beaker was added 400 ml of a pre-concentrated columbium fraction analyzed to contain 946.9 g/L $Cb_2O_5$ (662.8 g/L Cb) and 699.2 g/L F (F:Cb molar ratio ~5:1). 100 ml of water was added to this columbium solution. The mixture then was heated to boiling (~130°-160° C.) with agitation suitable to maintain hydrolyzed solids in suspension. During the course of heating, a hydrogen fluoride (HF)-containing aqueous fraction was recovered from the condenser; analysis of this 270 ml fraction showed the fraction to contain 305 g/L F. The remaining 230 ml of slurry then was cooled and filtered. The product filtered from the liquid phase was washed with deionized water and then dried. This free-flowing, granular product (230 gm) was analyzed to be columbium oxyfluoride ($CbO_2F$). The liquid phase filtrate measured 145 ml, of which 110 ml was recycled to the reactor (35 ml of filtrate was reserved for analysis). To the filtrate in the reactor was added 290 ml of preconcentrated aqueous columbium fraction and 100 ml of water. The reactor mixture again was heated to boiling under agitation and a 240 ml aqueous HF condensate was collected (analyzed to contain 328 g/L F). The resultant 252 ml slurry was cooled, filtered, washed, and dried; 190 gm of $CbO_2F$ product was recovered. The filtrate measured 182 ml, of which 162 again was recycled to the reactor (20 ml was reserved for analysis).

This general procedure was repeated for two additional cycles. Pre-concentrated aqueous columbium fraction (238 ml) and water (100 ml) was introduced to the reactor containing the recycled filtrate from the previous $CbO_2F$ recovery sequence. The reactor mixture was heated to boiling (~130°-160° C.) under agitation and 230 ml of aqueous HF condensate was collected (containing 347 g/L F). Additional pre-concentrated columbium fraction (214 ml) was added to the slurry along with another 100 ml of water. The reactor mixture was brought to boiling, under agitation, and 200 ml of aqueous HF was collected (containing 372 g/L F). The 360 ml resultant slurry was filtered to recover the $CbO_2F$ product. There remained 245 ml of filtrate. The washed and dried free-flowing, non-hydrated granular product weighed 340 gm.

EXAMPLE II

To a fluorocarbon distillation flask was added a 1000 ml sample of aqueous columbium fraction [containing 180 g/L $Cb_2O_5$ (126 g/L Cb) and 213 g/L F (F:Cb~8:1)] obtained by liquid/liquid extraction of an ore digestion solution. This columbium fraction was evaporated to half its volume (500 ml), after which 550 ml of additional columbium fraction was introduced into the reactor. The reactor contents then were evaporated until 550 ml of distillate was collected. Two more 550 ml portions of columbium fraction were successively introduced, followed by an evaporation of 550 ml subsequent to each columbium fraction addition. The final concentrate was analyzed to contain 914.3 g/L $Cb_2O_5$ (640 g/L Cb) in solution.

Three hydrolysis-crystallization cycles were then run. For each cycle, 690 ml of columbium fraction was added to the concentrated columbium fraction in the reactor. Each respective reaction mixture then was heated to boiling (~105°-125° C.), with agitation sufficient to suspend hydrolyzed solids, until the volume of distillate recovered was 645 ml. After each evaporation, the reaction mixture was cooled and filtered to remove the free-flowing, granular, non-hydrated columbium oxyfluoride ($CbO_2F$) product; the filtrate was recycled to the reactor where additional columbium fraction was introduced and the next cycle was initiated. Table A below summarizes the results obtained.

TABLE A

| Step No. | Volume (ml) Cb Fraction[1] To Reactor | Volume (ml) Evaporated | Analysis of Distillate | Analysis of Aqueous Reactor Contents | Product Recovered |
|---|---|---|---|---|---|
| 1 | 1000 | 0 | — | 126 g/L Cb | — |
| 2 | 0 | 500 | — | ~250 g/L Cb (est.) | — |
| 3 | 550 | 550 | — | ~390 g/L Cb (est.) | — |
| 4 | 550 | 550 | — | ~540 g/L Cb (est.) | — |
| 5 | 550 | 550 | — | 640 g/L Cb[2] | — |
| 6,7 | 690 | 645 | 145 g/L HF | 638 g/L Cb[3] | 140 g $CbO_2F$ |
| 8,9 | 690 | 645 | 138 g/L HF | 666 g/L Cb[3] | 86 g $CbO_2F$ |
| 10,11 | 690 | 645 | 163 g/L HF | 656 g/L Cb[3] | 119.5 g $CbO_2F$ |

[1]Analysis: 126 g/l Cb, 213 g/L F
[2]35 ml sample of reactor contents withdrawn for analysis
[3]Reactor contents filtered; precipitated product recovered; 35 ml sample of filtrate withdrawn for analysis - remainder of filtrate recycled to reactor

EXAMPLE III 282 kg of columbium solution were charged into a 170-liter reactor equipped with a turbine-type agitator and electric heaters. The columbium solution had a density of about 1.8 g/cc at 25° C., and contained about 493 g/L Cb and 565 g/L F (a 5.6 molar ratio of F:Cb). The columbium solution was boiled and $CbO_2F$ crystallized as a suspension of a granular, readily filterable, solid. The vapor was condensed in a water-cooled shell and tube heat exchanger. At equilibrium, the normal boiling point of the solution was 155±5° C. About 20% by volume of the $CbO_2F$-mother liquor slurry was drained from the reactor every 2 to 4 hours, filtered, and the filtrate returned to the reactor. The $CbO_2F$ filter cake was washed with 10% by weight of water, and the wash solution was also returned to the reactor. During the test the volume within the reactor was maintained essentially constant by adding additional columbium solution as required. This test was run on a continuous basis for 116 hours, and during that time a total of 2,821 kg of columbium solution and 112 kg of H$_2$O wash were added. A total of 1,384 kg of condensate was collected; this condensate had an average assay of 50 w% HF in water. The wet CbO$_2$F filter cake weighed 1,292 kg (as filtered) and 1,187 kg after drying at 120° to 240° C. The dried CbO$_2$F was granular, free flowing, and assayed 13.8 w% F and 64 w% Cb. The mother liquor at the end of the test weighed 210 kg.

Total weight charged during the test was 2,821 kg columbium solution and 112 kg of water for a total of 2,933 kg charged. Total weight recovered was 1,384 kg of condensate, 1,292 kg of CbO$_2$F filter cake, 210 kg of mother liquor for a total of 2,886 kg recovered. 6 kg were not accounted for.

The embodiments of the invention in which an exclusive property or privilege is claimed are defined as follows:

1. A process for the production of columbium oxyfluoride comprising;

heating to boiling in a reactor, with agitation, an aqueous feed solution containing hydrofluoric acid and dissolved columbium to thereby cause evaporation and hydrolysis of the aqueous feed solution to occur resulting in the formation of a columbium oxyfluoride-containing slurry, said agitation sufficient to maintain the hydrolyzed product in suspension; and recovering the columbium oxyufluoride from the slurry, as formed, by separating the columbium oxyfluoride from the liquid phase of the slurry.

2. The process as defined in claim 1 wherein the solution is heated to a temperature of at least about 100° C.

3. The process as defined in claim 1 wherein the solution is heated to a temperature ranging from at least about 100° C. to about 180° C.

4. The process as defined in claim 1 wherein the solution is heated to a temperature ranging from about 150° C. to about 160° C.

5. The process as defined in claim 1 wherein the aqueous feed solution contains dissolved columbium in an amount ranging from about 25 to about 700 g/L.

6. The process as defined in claim 1 wherein the aqueous feed solution contains dissolved columbium in an amount ranging from about 250 to about 600 g/L.

7. The process as defined in claim 1 wherein the aqueous feed solution contains dissolved columbium in an amount of about 500 g/L.

8. The process as defined in claim 1 wherein the aqueous feed solution contains hydrofluoric acid and dissolved columbium in amounts such that the molar ratio of fluorine to columbium in the aqueous feed solution is at least 4.

9. The process as defined in claim 1 wherein the aqueous feed solution contains hydrofluoric acid and dissolved columbium in amounts such that the molar ratio of fluorine to columbium in the aqueous feed solution is at least 4.5.

10. The process as defined in claim 1 wherein the aqueous feed solution contains hydrofluoric acid and dissolved columbium in amounts such that the molar ratio of fluorine to columbium in the aqueous feed solution is about 5.5 to about 6.0.

11. A process for the production of columbium oxyfluoride comprising:

(a) heating to boiling in a reactor, with agitation, an aqueous feed solution containing hydrofluoric acid and dissolved columbium to thereby cause evaporation and hydrolysis of the aqueous feed solution to occur resulting in the formation of a columbium oxyfluoride-containing slurry, said agitation sufficient to maintain the hydrolyzed product in suspension;

(b) recovering the columbium oxyfluoride from a portion of the slurry, as formed, by separating the columbium oxyfluoride from the liquid phase of the slurry portion;

(c) recycling the resulting separated liquid phase to the reactor; and (d) introducing additional aqueous feed solution to the reactor at a rate sufficient to maintain a suitable volume of slurry and to prevent the slurry from evaporating to dryness.

12. The process of claim 11 wherein the columbium oxyfluoride is continuously recovered from a portion of the slurry and additional aqueous feed solution is continuously introduced to the reactor at a rate sufficient to maintain a suitable volume of slurry.

13. The process as defined in claim 11 wherein the solution is heated to a temperature of at least about 100° C.

14. The process as defined in claim 11 wherein the solution is heated to a temperature ranging from at least about 100° C. to about 180° C.

15. The process as defined in claim 11 wherein the solution is heated to a temperature ranging from about 150° C. to about 160° C.

16. The process as defined in claim 11 wherein the aqueous feed solution contains dissolved columbium in an amount ranging from about 25 to about 700 g/L.

17. The process as defined in claim 11 wherein the aqueous feed solution contains dissolved columbium in an amount ranging from about 250 to about 600 g/L.

18. The process as defined in claim 11 wherein the aqueous feed solution contains dissolved columbium in an amount of about 500 g/L.

19. The process as defined in claim 11 wherein the aqueous feed solution contains hydrofluoric acid and dissolved columbium in amounts such that the molar ratio of fluorine to columbium in the aqueous feed solution is at least 4.

20. The process as defined in claim 11 wherein the aqueous feed solution contains hydrofluoric acid and dissolved columbium in amounts such that the molar ratio of fluorine to columbium in the aqueous feed solution is at least 4.5.

21. The process as defined in claim 11 wherein the aqueous feed solution contains hydrofluoric acid and dissolved columbium in amounts such that the molar ratio of fluorine to columbium in the aqueous feed solution is about 5.5 to about 6.0.

* * * * *